US008326760B2

(12) United States Patent
Ma et al.

(10) Patent No.: US 8,326,760 B2
(45) Date of Patent: Dec. 4, 2012

(54) COMPUTER-BASED COLLECTIVE INTELLIGENCE RECOMMENDATIONS FOR TRANSACTION REVIEW

(75) Inventors: Jianjie Ma, Cupertino, CA (US); Benjamin Scott Boding, Mountain View, CA (US); Shawna Bushart, San Jose, CA (US)

(73) Assignee: Cybersource Corporation, Mountain View, CA (US)

( * ) Notice: Subject to any disclaimer, the term of this patent is extended or adjusted under 35 U.S.C. 154(b) by 235 days.

(21) Appl. No.: 12/881,001

(22) Filed: Sep. 13, 2010

(65) Prior Publication Data

US 2012/0066125 A1 Mar. 15, 2012

(51) Int. Cl.
*G06Q 40/00* (2012.01)
(52) U.S. Cl. .............................. 705/44; 705/35
(58) Field of Classification Search ...................... 705/35
See application file for complete search history.

(56) References Cited

U.S. PATENT DOCUMENTS 7,970,701 B2 * 6/2011 Lewis et al. ..................... 705/38
8,019,678 B2 * 9/2011 Wright et al. ................... 705/38

OTHER PUBLICATIONS

Worldwide Computer Products News—Aug. 18, 2000—CyberSource launches new software it help prevent online fraud (C)1995-2000 M2 Communications LTD http://www.m2.com.*

CyberSource(R) Launches New Global Professional Services Solutions to Help Businesses Combat eCommerce Fraud During the Holiday Season. The Free Library > Date > Aug. 16, 2000 > PR Newswire.*
"CyberSource Risk Management Solutions" published Mar. 2008 (8 pages).

* cited by examiner

*Primary Examiner* — William Rankins
(74) *Attorney, Agent, or Firm* — Kilpatrick Townsend & Stockton LLP

(57) ABSTRACT

In an embodiment, a data processing method comprises obtaining a plurality of first transaction data items for a proposed online credit card purchase transaction that has been recommended for review; obtaining a plurality of second transaction data items for a set of similar past online credit card purchase transactions, wherein each member of the set has one or more transaction feature values that are similar to the transaction data items of the proposed online credit card purchase transaction, and a decision value specifying whether the member was accepted or rejected by a reviewer; obtaining a stored data model of features, feature values, transaction acceptance decisions and rejection decisions of the reviewer based at least in part on the set, determining, based on applying the first transaction data items to the stored data model and a subsequent query to the database among more recent transactions that were not included during model construction, a likelihood value of a particular decision of whether the proposed online credit card purchase transaction would be accepted or rejected by the reviewer of the merchant; causing the likelihood value to be displayed; wherein the method is performed by one or more computing devices.

87 Claims, 7 Drawing Sheets

COMPUTER-BASED COLLECTIVE INTELLIGENCE RECOMMENDATIONS FOR TRANSACTION REVIEW

FIELD OF THE INVENTION

The present invention relates to review of transactions.

BACKGROUND

As the ways in which consumers may purchase goods and services using credit cards, debit cards, or other online payment mechanisms both increase in number and convenience, the opportunities for fraudulent transactions to cost merchants (and ultimately, consumers) also increases. Many merchants use one or more validation tools to attempt to identify fraudulent orders prior to completing a transaction. These validation tools may be considered part of a risk management pipeline in which an order enters the pipeline and retained revenue exits the pipeline.

After receipt of an online order, the order usually is queued for automated screening. The automated screening may immediately reject some orders, and may send other orders further down the pipeline for manual review. This manual review represents a profit leak from the pipeline in labor costs. In some cases, human reviewers may spend eight minutes of review time per order or more. Labor costs may account for over half of the typical merchant's fraud management budget.

Orders sent to manual review are either accepted or rejected; fraudulent orders that are incorrectly accepted as genuine add to fraud losses, and legitimate orders that are incorrectly flagged as fraudulent represent lost sales and potential loss of customer goodwill. Automated screening that properly invokes the manual review process for the fewest number of orders, while still correctly flagging the pool of fraudulent orders, will help plug leaks in the risk management pipeline. Similarly, better tools to aid the reviewer in the manual review process will directly lower labor costs for merchants, and increase the probabilities of accepting genuine orders and rejecting fraudulent orders.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
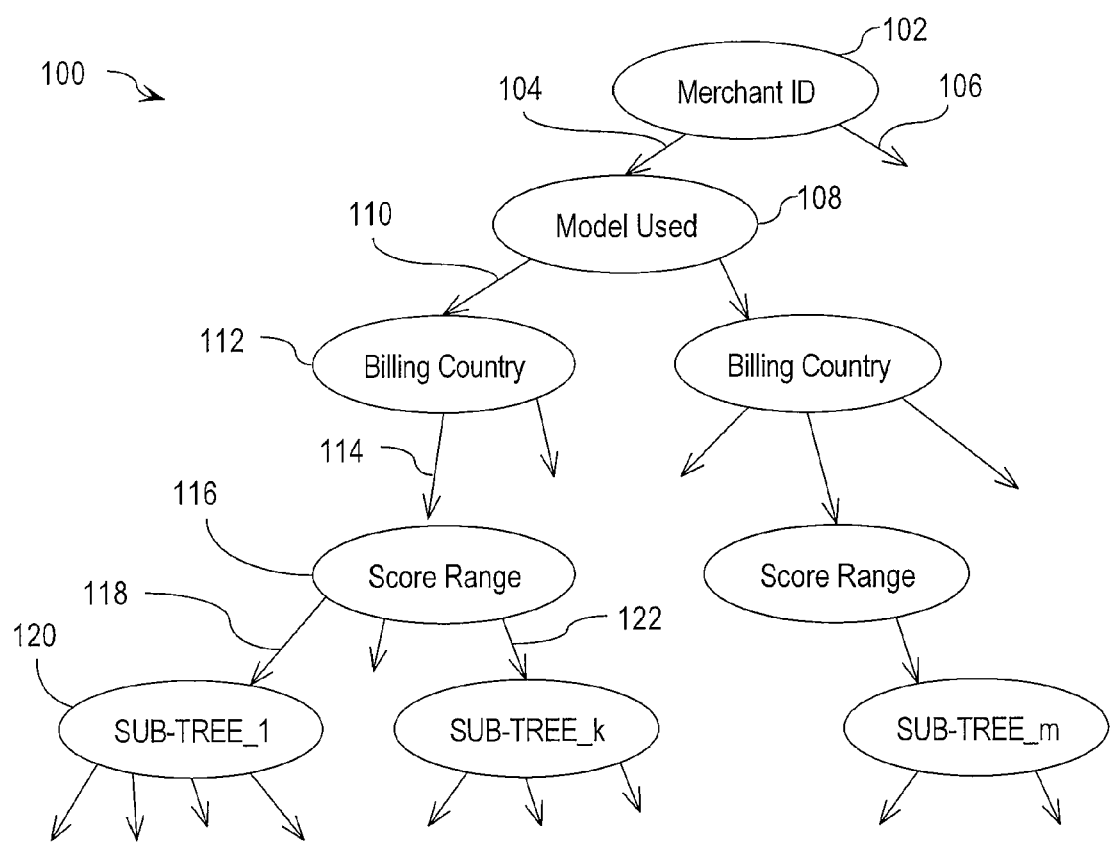
FIG. 1 illustrates a hierarchical decision tree.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

In an embodiment, a data processing method comprises obtaining a plurality of first transaction data items for a proposed online credit card purchase transaction that has been recommended for review; obtaining a plurality of second transaction data items for a set of similar past online credit card purchase transactions, wherein each member of the set has one or more transaction feature values that are similar to the transaction data items of the proposed online credit card purchase transaction, and a decision value specifying whether the member was accepted or rejected by a reviewer; obtaining a stored data model of features, feature values, transaction acceptance decisions and rejection decisions of the reviewer based at least in part on the set; determining, based on applying the first transaction data items to the stored data model, a likelihood value of a particular decision of whether the proposed online credit card purchase transaction would be accepted or rejected by the reviewer of the merchant; causing the likelihood value to be displayed; wherein the method is performed by one or more computing devices.

As context, certain embodiments may be used in online transactions relating to the purchase of goods and services by credit card, in which a customer initiates an order or other transaction using an online facility provided by a merchant. The customer order is represented in transaction data stored in a merchant computer. Transaction data is communicated electronically by the merchant to a networked transaction review service that is configured to provide transaction review services. A reviewer, associated with the merchant or the transaction review service, can use a computer terminal to review the details of transactions that the computer has recommended for review as potentially fraudulent. A transaction may be recommended for review after triggering on one or more decision rules set by the merchant. For example, a transaction review may be initiated when a fraud score exceeds a merchant's threshold value.

At a modeling computer, data items are collected related to a proposed online credit purchase transaction that has been recommended for review. A set of similar past online credit purchase transactions are identified. Each member of the set has one or more transaction features having transaction feature data values that are similar to the transaction data items of the proposed online credit purchase transaction, and a decision value specifying whether the member of the set was actually accepted or rejected by a reviewer after review.

The modeling computer stores a data model in memory representing transaction features, transaction feature values, transaction acceptance decisions and rejection decisions that the reviewer could perform or did perform, based at least in part on the set of similar transactions.

In an embodiment, the data model is used to automatically determine a likelihood value representing a particular decision of whether the proposed online credit card transaction would be accepted or rejected by the reviewer of the merchant if the reviewer actually reviewed the transaction data.

In an embodiment, the data model is used to determine a subset of transaction features used to define "similarity" for the current transaction under review.

In an embodiment, the data model is a decision tree represented by an XML file. Each node in the decision tree has one or more attributes, such as the number of rejected and accepted transactions taken from a portion of a database containing historical transactions used to construct the model.

In an embodiment, the database is queried to obtain transaction data, which when combined with the decision tree, determines a likelihood value. The likelihood value is displayed to the reviewer on the reviewer's computer display as additional information for the reviewer to consider while making a decision whether to accept or reject the proposed online credit card transaction.

In an embodiment, the transaction features, transaction feature values, transaction acceptance decisions and rejections decisions of stored data model may be associated with past transaction acceptance decisions and rejections decisions of one or more reviewers identified as possessing superior decision-making abilities. In an embodiment, the stored data model may be rendered in computer memory in the form of a decision tree in part by selecting a subset of relevant features from the set of feature data comprising each transaction. For example, there may be transaction features in the stored data model that ultimately are unimportant or not used in reaching a result for a particular transaction, and such unnecessary elements of the model may be omitted from the decision tree. In an embodiment, the subset of relevant features populates the decision tree using hierarchical feature selection.

Credit Transaction Information

Many types of data are captured as part of a proposed online credit transaction and may be made available to a reviewer. As used herein, each type of data is termed a feature, such that each proposed transaction and historical transaction is a collection of data values, with one data value corresponding to one feature. Examples of features include:

1. Name or type of fraud scoring model that is used to score a transaction;
2. Country identified in a billing address for the customer;
3. Country identified in a shipping address for the transaction;
4. Fraud score;
5. One or more Decision rules that triggered the manual review;
6. One or more Factor codes, described below;
7. One or more Information codes, described below;
8. Merchant identifier uniquely identifying a merchant of the goods or services involved in the transaction;
9. Name, number or other identifier of the reviewer;
10. Organization that is performing the review.

In this context, a Factor code represents groupings of contributions to the risk level of the transaction. For example, a Factor code of "v" may represent a high velocity risk related to the transaction, in which identity information included in the transaction is repeated multiple times. A Factor code of "c" may represent an increase risk level because of multiple account changes appearing in the history of the transaction.

In this context, an Information code represents individual anomalies found within the transaction and which may indicate a higher risk level. For example, one Information code may indicate use of a free e-mail address used in the transaction, or that multiple different e-mail addresses appear in the history of the transaction. Another Information code may indicate repeated use of the credit card used in the transaction during the past 15 minutes in other transactions.

In a simplified example, a sample historical transaction may include the following data values for the following corresponding features: {US (country of billing), CA (country of shipping), 60~70 (score range), H (factor code), VEL_ADDR (information code), 336577 (merchant identifier)}.

Additionally, a sample historical transaction may include other information indicating the review history of the transaction. In an embodiment, data values may indicate the following history regarding the transaction:

1. the transaction was immediately accepted or rejected;
2. the transaction was accepted or rejected after further automatic review; or
3. the transaction underwent manual review, the acceptance or rejection decision of the reviewer, and an identifier identifying the reviewer.

In an embodiment, a decision of the manual reviewer may have values of either "accept" or "reject."

An actual proposed transaction or an actual historical transaction may have data values for over 60 features. Even if each feature has only a few possible data values, the total number of possible unique transactions grows exponentially. For example, if a transaction comprises 60 features, and each feature may take on one of three possible data values, the number of possible unique transactions is $3^{60}$, or approximately $4.23 \times 10^{28}$ transactions. Therefore, it may be impractical to store, in computer data storage capable of retrieval or review in a reasonable time, all features of all transactions. Additionally, as more transaction features are used to determine similarity among transactions, the number of actual transactions that satisfy the similarity criteria becomes too small from which to form a model. Thus feature selection described below is performed to locate a subset of features. The approaches herein provide the benefit of capturing an association of reviewer decisions to characteristics of historic transactions, for use in predicting reviewer decision on current transactions, without the need to store all features of all historic transactions.

A decision tree based on a data model of historic transactions need not include all features of the historic transactions. In the discussion of construction of a sample data model below, example transaction features that may be used in construction of a hierarchical decision tree as part of an embodiment are further described.

Sample Model Construction—Top Nodes

In an embodiment, creating and storing the stored data model may result in creating and storing a hierarchical decision tree. In an embodiment, one pre-determined transaction feature is associated with a root node of the decision tree. The root node corresponds to a top-most decision rule to be applied to data values of a first transaction feature. A selected set of child nodes associated with corresponding transaction features are also pre-determined.

FIG. 1 illustrates a hierarchical decision tree. In FIG. 1, hierarchical decision tree 100 represents transaction features as nodes, and each branch from a node corresponding to the path traveled based on the data value of the transaction feature. Any transaction feature appearing in hierarchical decision tree 100 is represented as one or more nodes of hierarchical decision tree 100. The illustration in FIG. 1 is not intended to depict a complete hierarchical decision tree 100 but rather to provide a representative portion.

In hierarchical decision tree 100, transaction features that are more discriminating in predicting a likelihood of accepting or rejecting a transaction under review are represented as nodes closer to the root of hierarchical decision tree 100 than transaction features that are less discriminative. In hierarchical decision tree 100, a subset of transaction features have been preselected for use at the top levels of hierarchical decision tree 100. Alternatively, determining and selecting the subset of transaction features, which are more discriminating, could be performed using the methods described below for the determination of sub-trees. In hierarchical decision tree 100, the top levels of preselected transaction features correspond to the following transaction features: Merchant Identifier (root), Model Used (first level), Country of Billing (second level), and Score Range (third level). Other preselected transactions may be included in the model, but are not illustrated here for clarity. For example, in an embodiment, the one or more Decision rules that trigger manual review may appear as a preselected transaction feature appearing on the fourth level of hierarchical decision tree 100.

Merchant ID 102 is the transaction feature at the root node of hierarchical decision tree 100, and paths downward from the root node are determined by the data value of Merchant ID 102. If there are "n" unique values corresponding to a total of "n" possible merchants, edge 104 may represent deciding that the transaction is for the first merchant, and edge 106 may represent deciding that the transaction is for the n-th merchant; for example, the data value of Merchant ID 102 representing the first merchant may be "ACME." For ease of illustration, paths following edge 106 are not illustrated. In FIG. 1, "n" edges leave the root node, even though only edge 104 and edge 106 are illustrated.

Model Used 108 is the transaction feature appearing at the first level of hierarchical decision tree 100. As illustrated, edge 110 may represent the decision made for the data value of "default" value for Model Used 108. Thus, edge 110 is directed towards features that were considered for historical transactions that were scored using a default fraud scoring model.

Billing Country 112 is the transaction feature appearing at the second level of hierarchical decision tree 100. As illustrated, edge 114 may represent the decision made for the data value of "US" for Billing Country 112. Thus, nodes below edge 114 represent tests and decisions for historic transactions for which the billing address was in the United States.

Score Range 116 is the transaction feature appearing at the third level of hierarchical decision tree 100. The Score Range 116 is used to discriminate among the fraud score value that was assigned to a transaction by a separate fraud scoring engine of the merchant or from a service provider. In this example, a transaction's fraud score value may range from zero to 100, and the transaction's score value is placed in one of "k" preselected intervals that comprise the complete range. For example, edge 118 may represent the decision made for the data value falling within the range of zero to ten for Score Range 116 (corresponding to the first interval in the complete range). Edge 122 may represent the decision made for the data value falling in the range of 96 to 100 for Score Range 116 (corresponding to the k-th interval in the complete range).

Sub-tree_1 120 is the transaction feature appearing at the fourth level of hierarchical decision tree 100, in which there are a total of "m" sub-trees at the fourth level of hierarchical decision tree 100. Thus, if the final determination to be made for a candidate transaction is a descendent of sub-tree_1 120, then the candidate transaction must have at least the following transaction feature values:

---
{Merchant ID = "ACME", Model Used = "default", Billing Country = "US", Score Range = "0-10"}.
---

Sample Model Construction—Sub-Trees

In FIG. 1, a subset of transaction features have been preselected for use at the top four levels of hierarchical decision tree 100. In other embodiments, transaction features are preselected from level zero to an arbitrary level. Thus, for example, in an embodiment, no transaction features are preselected, and hierarchical decision tree 100 is determined using the construction of sub-trees, described here and with respect to FIG. 2.

In an embodiment, the set of candidate features comprise features corresponding to factor codes and information codes. In an embodiment each factor code and information code candidate feature may only take on values of one (corresponding to "fired") and zero (corresponding to "not fired.")

Figure 2:
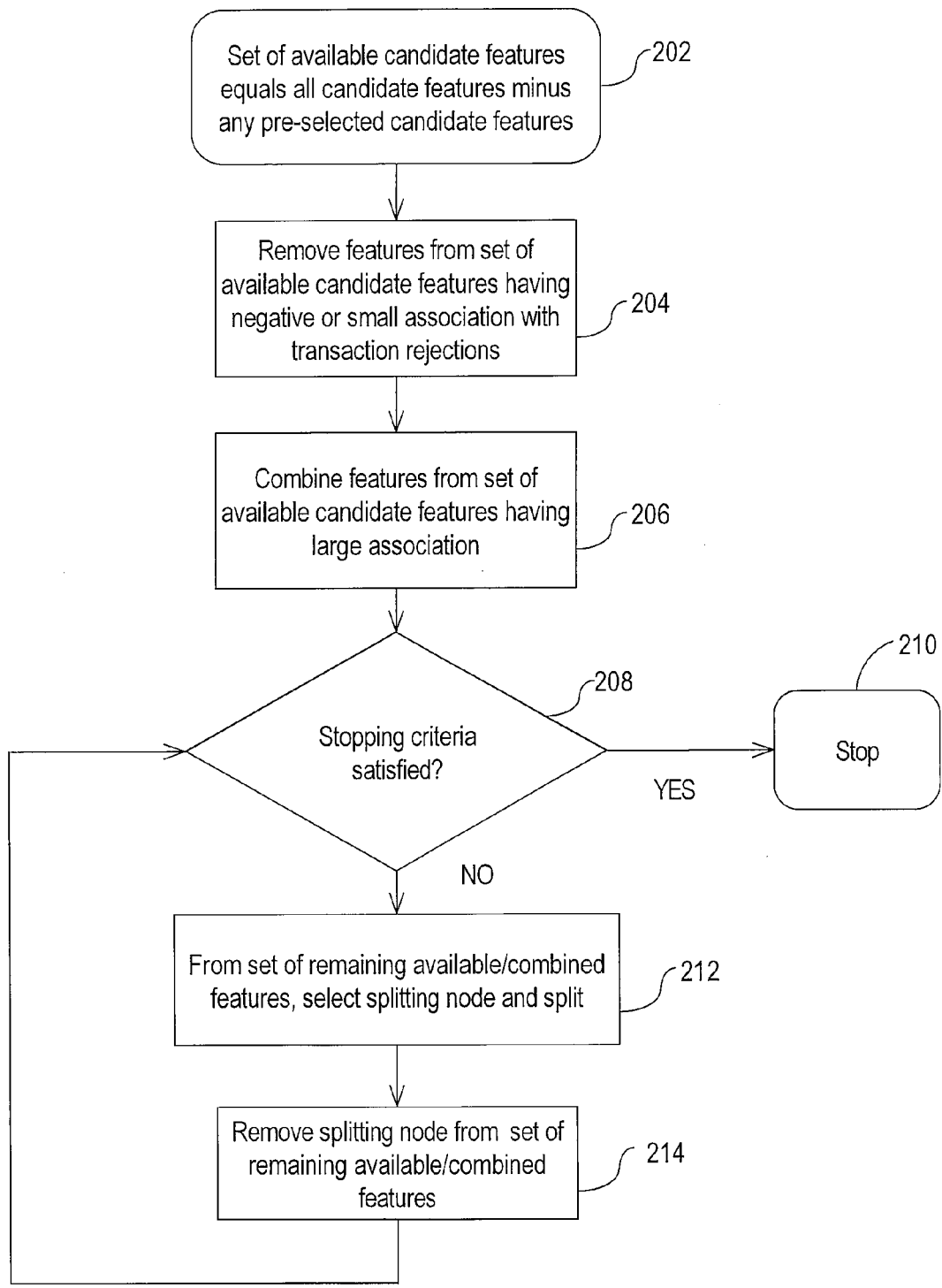
FIG. 2 illustrates constructing a hierarchical decision tree.

In an embodiment, the process of FIG. 2 is performed on a modeling computer for each sub-tree whose ancestors' nodes correspond to preselected transaction features. For example, FIG. 1 has "m" sub-trees at the fourth level of hierarchical decision tree 100, beginning with sub-tree_1 120, and FIG. 2 is performed first with respect to sub-tree_1 120. The steps of FIG. 2 are then performed with respect to the second sub-tree at the fourth level of hierarchical decision tree 100, and then repeated with respect to the third sub-tree at the fourth level of hierarchical decision tree 100. This procedure is repeated until completed on the last (m-th) sub-tree at the fourth level of hierarchical decision tree 100.

At step 202, the modeling computer determines the set of available candidate features used to construct nodes in the sub-tree comprises all candidate features, minus any preselected candidate features. For example, with reference to FIG. 1, the set of all candidate features for sub-tree_1 120 comprises all candidate features, minus the preselected candidate features Merchant ID 102, Model Used 108, Billing Country 112, and Score Range 116.

At step 204, zero or more features from the set of available candidate features are removed from the set of available candidate features. The removed features are not used in sub-tree construction because the data values corresponding to the removed features have little or no association with the class variable DM_RESULT (corresponding to a decision result) taking on the value "reject", and thus inclusion of the removed features into the model would not increase the discrimination powers of the model.

In an embodiment, a feature is removed based on an association between the data values of the removed feature and the transaction data for which DM_RESULT equals "reject." In an embodiment, the feature is removed when the absolute value of the calculated association is less than a preselected value. In an embodiment, the association is quantified by statistical lift, that is a ratio between the probability of DM_RESULT="reject," given the feature takes on the value, and the probability of DM_RESULT="reject," given the feature does not take on the value.

At step 206, the set of available candidate features is compared, and features whose data values are highly associated are combined. In an embodiment, each possible pairwise correlation among data values of each possible pair of available candidate features is calculated. In an embodiment, a pair of available candidate features is combined when the absolute value of the calculated correlation is greater than a preselected value.

Once a pair of available features whose data values are highly associated is determined, each feature of the pair of available features is removed from the set of available candidate features, and single combined candidate feature representing the pair of features is added to the set of available candidate features. In an embodiment, patterns other than pairwise association may be used to combine candidate features.

For example, if the set of available candidate features comprises the features MORPH_FP, MORPH_FE, MORPH_FC, and MORPH_FS, and available features {MORPH_FP=1} and {MORPH_FS=1} are highly associated, the resulting set of available candidate features becomes MORPH_FE, MORPH_FC, and MORPH_FP-MORPH_FS, in which combined available feature MORPH_FP-MORPH_FS is a combination of features MORPH_FP and MORPH_FS. Similarly, if {MORPH_FP=1, MORPH_FE=1, MORPH_FC=1} is mined to be a frequent pattern, the resulting set of available candidate features becomes MORPH_FS and MORPH_FP-MORPH_FE-MORPH_FC.

In an embodiment, data values for the combined available feature are determined based on the data values for each feature used to form the combined available feature. In an embodiment, data values for the combined available feature are set equal to the data values of one of the two available features used to form the combined available feature. In an embodiment, each feature of the pair of available features takes on data values of zero or one, and data values for the combined available feature are set equal to the logical "or" value of the data values of the pair of the available features used to form the combined available feature.

Evaluation of the stopping criteria at step 208 is discussed below after discussion of step 212. If the stopping criteria are satisfied, then the procedure terminates at step 210.

At step 212, a feature from the set of remaining available/combined features is selected as the splitting node to be added to the sub-tree. In an embodiment, each splitting node is determined using a contingency table calculated for each candidate feature from the set of remaining available/combined features. A contingency table is constructed using the set of historical transactions corresponding to the parent node of the sub-tree, with this set separated in subsets representing the acceptance or rejection the historical transactions, and separated by the data values of each candidate feature.

In an embodiment, each candidate feature takes on data values of zero or one. A data value of one corresponds to the "firing" of the candidate feature, and a data value of zero corresponds to the candidate feature "not firing." "Firing," in this context, means that a candidate feature in a particular transaction, which may be a historical transaction, has a data value of one with respect to a particular outcome for the particular transaction. For example, the data value to record a transaction in which a particular Information Code corresponds to use of a free e-mail address may be set equal to one, and the data value to record a transaction in which the particular Information Code does not correspond to a use of a free e-mail address may be set equal to zero. Thus, for all transactions in which the particular Information Code corresponds to a use of a free e-mail address, the Information code candidate feature has "fired." A contingency table for this candidate feature could appear as follows:

| Contingency Table for Candidate Feature | | | |
|---|---|---|---|
| | Not Fired(=0) | Fired(=1) | Total |
| Accepted | $N_{00}$ | $N_{01}$ | $N_{0+}$ |
| Rejected | $N_{10}$ | $N_{11}$ | $N_{1+}$ |
| Total | $N_{+0}$ | $N_{+1}$ | N |

For example, if the contingency table above corresponds to one of the available candidate features considered for use as the splitting node for sub-tree_1 120, then out of "N" total historical transactions representing historical transactions that having data values that satisfy the parent of sub-tree_1 120, "$N_{00}$" historical transactions of the total were accepted when the candidate feature was not fired. Similarly, in "$N_{11}$" of the rejected historical transactions of the total, the available candidate feature was fired. In this context, constructing the contingency table comprises counting transactions from the set of historical transactions, and a storing the counts in computer memory in a table data structure, or an equivalent.

Clearly, it is desirable to select the available candidate feature for use as the splitting node that provides the most information relating to a transaction decision. In an embodiment, a relative entropy measure is used as a selection metric. In an embodiment, the relative entropy measure is defined as:

$$\text{relative entropy (RE)} = P_1 \log_2(P_1/Q_1) - (1-P_1)\log_2((1-P_1)/(1-Q_1)), \text{ where } P_1 = N_{11}/N_{+1} \text{ and } Q_1 = N_{10}/N_{+0},$$

In an embodiment, an absolute risk is used as a selection metric. In an embodiment, the absolute risk is defined as:

$$\text{absolute risk (AR)} = (N_{11}/N_{+1}) - (N_{10}/N_{+0}),$$

In an embodiment, a relative risk is used as a selection metric and is defined as:

$$\text{relative risk (RR)} = (N_{11}/N_{+1})/(N_{10}/N_{+0}),$$

Each selection metric provides a quantitative measurement that connects the historical data regarding an available candidate feature to the final determination made regarding whether to accept or reject transaction in each transaction comprising the historical data.

In an embodiment, the selected candidate feature selected for use as the splitting node from set of remaining available features or combined features is the available candidate feature having the largest relative entropy value. When a splitting node is selected, the splitting node is stored in memory as part of the tree at a current node position.

In an embodiment, when the difference of the two available candidate features having the two largest relative entropy values is within a preselected value, the selected candidate feature selected for use from the pair is the available candidate feature having the higher firing rate.

After the selected candidate feature has been selected in step 212, at step 214 the selected candidate feature is removed from the set of remaining available/combined features and the stopping criteria are evaluated at step 208. Steps 208-214 are performed recursively so that each branch of a sub-tree is completely constructed prior to attempting to construct another branch from the parent of the sub-tree.

A variety of criteria may be used in step 208 to determine the termination of a branch of sub-tree. In an embodiment, termination occurs when the value of "N" described above is less than a preselected value, e.g., the number of total transactions is less than 20. In an embodiment, termination occurs when the accept rates for each of the remaining available/combined candidate features are within a preselected value of one another. In an embodiment, termination occurs when the rejection rates for each of the remaining available/combined features are within a preselected value of one another.

In an embodiment, termination occurs when the largest value of the relative entropy is less than preselected positive value. For example, if all values in the contingency table are equal to the value "n," then the contingency table has the contents:

| Contingency Table for Candidate Feature that Provides No Information | | | |
|---|---|---|---|
| | Not Fired | Fired | Total |
| Accepted | n | n | 2n |
| Rejected | n | n | 2n |
| Total | 2n | 2n | N = 4n |

Then $P_1 = N_{11}/N_{+1} = \frac{1}{2}$ and $Q_1 = N_{10}/N_{+0} = \frac{1}{2}$, and RE equals $P_1 \log_2(P_1/Q_1) - (1-P_1)\log_2((1-P_1)/(1-Q_1))$, or $\frac{1}{2} \log_2(1) - (1-\frac{1}{2})\log_2((1-\frac{1}{2})/(1-\frac{1}{2}))$, which equals zero.

In a contingency table in which all measured data values for a candidate feature under the combinations {Accepted/Not Fired, Accepted/Fired, Rejected/Not Fired, Rejected/Fired} have the same value of "n," incorporation of this candidate feature into the model adds no new information, as the value of the candidate feature provides no more further statistical connection to the acceptance or rejection of the transaction.

Sample Transaction Review Using Hierarchical Decision Tree

Figure 3:
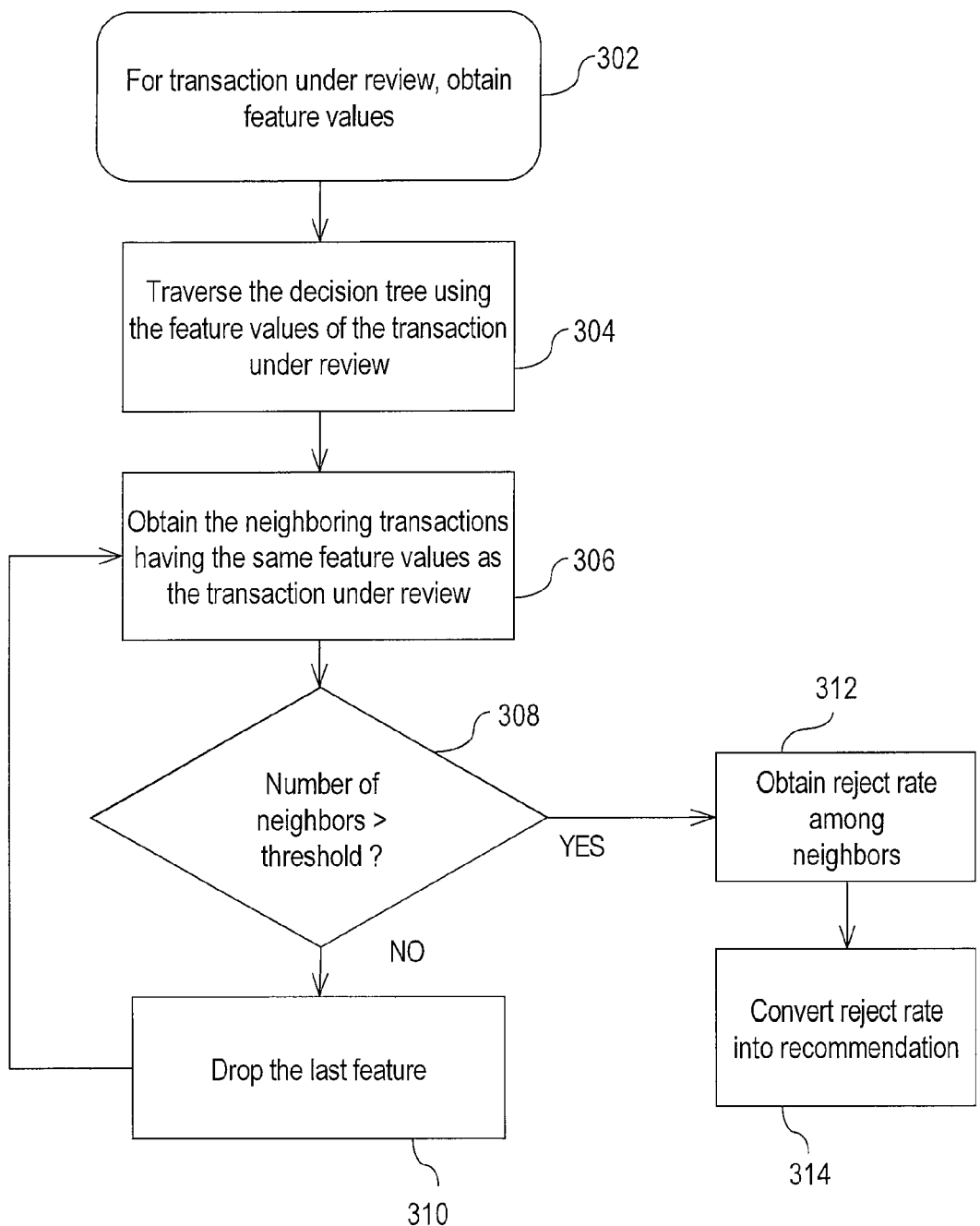
FIG. 3 illustrates determining a recommendation for a transaction under review.

Once all branches of the hierarchical decision tree have been constructed, the hierarchical decision tree may be used as part of a decision system. An embodiment of a method of using the hierarchical decision tree as part of a decision system is illustrated in FIG. 3.

In step 302, transaction feature values for a transaction under manual review are obtained. In one embodiment, the reviewing computer obtains, from a transaction management system, a data record for a transaction that has been flagged or identified as suggested for manual review, and feature data values are obtained from the record. For example, consider an enlarged version of the transaction described above, having the following transaction features and transaction feature values:

{Merchant ID = "ACME", Model Used = "default",
Billing Country = "US", Score Range = "0-10",
VEL_ADDR = 0, MORPH_FP = 0, RISK_AC = 0,
RISK_PH = 1, INTL_BIN = 0, MUL_EM = 1,
MM_EMBCO = 1}.

In step 304, the hierarchical decision tree is traversed using data for the transaction under review, to obtain a set of "neighbors" of the transaction under review that share the set of transaction feature values. For example, traversal involves starting at a root node of the decision tree, determining what feature the node represents, finding the value for that feature in the data for the transaction under review, and determining which edge to follow based on the value in comparison to a decision represented in the node. Following an edge leads to a next node at which the process is repeated for another feature, until a terminal node of the tree is reached. The terminal node is associated with identifiers for other historic transactions having all the same transaction feature values that led to that terminal node; these historic transactions are neighbor transactions, and each such neighbor transaction has an associated decision value representing a reviewer's actual historic decision for that transaction.

In step 306, the number of neighbors, that is the number of transactions in which the reviewer decision is "reject" and the number of transactions in which the reviewer decision is "accept," is obtained. Each of the number of "reject" transactions and the number of "accept" transactions is an attribute of the stored data model, with the transaction numbers obtained by querying the database for database transactions occurring over a recent period. In an embodiment, the transaction numbers reflect a period of 18 months. In an embodiment, the data comprising the transaction numbers is not used to construct the hierarchical decision tree.

The number of neighbors is compared to a threshold value in step 308. In an embodiment, the threshold value is set to a fixed value; for example, the threshold value may be set to 20. In an embodiment, the threshold value is a function of one or more termination values used in the construction of the hierarchical decision tree. The threshold value represents whether the number of neighbors is large enough to provide an adequate basis for predicting a decision of a reviewer for the current transaction under review.

If the number of neighbors of the transaction under review exceeds the threshold value, then in step 312, the overall reject rate among the neighbors is obtained. For example, for the example transaction shown above, suppose the number of neighbors is 40, in which 10 transactions were rejected and 30 transactions were accepted. The reject rate is then 10/40, or 25%. In step 314, the reject rate is converted into a recommendation.

In an embodiment, the recommendation is the reject rate. Thus, in an embodiment, a user of the decision system would receive a message indicating that in a database of historical transactions, transactions similar to the transaction under review were rejected 25% of the time.

However, the number of neighbors for a transaction under review may be small, or even zero, should the transaction under review correspond to a sparsely populated portion of the hierarchical decision tree. Thus in step 308, should the number of neighbors be less than the threshold value, in step 310, the last feature of the transaction under review is dropped to enlarge the neighborhood of similar transactions under review. Control resumes at step 306 using the enlarged neighborhood under review.

For example, should the number of neighbors of the sample transaction:

{Merchant ID = "ACME", Model Used = "default",
Billing Country = "US", Score Range = "0-10",
Info_Code1 = 0, Info_Code2 = 0, Info_Code3 = 0,
Info_Code4 = 1, Info_Code5 = 0, Info_Code6 = 1,
Info_Code7 = 1} be less than the threshold value, the feature Info_Code7 is removed, and the modified transaction:

{Merchant ID = "ACME", Model Used = "default",
Billing Country = "US", Score Range = "0-10",
Info_Code1 = 0, Info_Code2 = 0, Info_Code3 = 0,
Info_Code4 = 1, Info_Code5 = 0, Info_Code6 = 1} is used as the input for step 306.

In an embodiment, should the number of neighbors be less than the threshold value, the historical transaction database is queried over a longer period to obtain a larger number of transactions that comprise the number of "reject" transactions and the number of "accept" transactions of the stored data model.

In an embodiment, the database of transaction data includes a historical portion of the database comprising transaction data used to construct the hierarchical decision tree, and a portion of the database containing transaction data collected after construction of the hierarchical decision tree. In an embodiment, the number of neighbors for a sample transaction is determined for both database portions. In an embodiment, more weight is given to decision results corresponding to manual review decisions made after construction of the hierarchical decision tree. This is described further below with reference to FIG. 5.

Sample Transaction Review System

Figure 4:
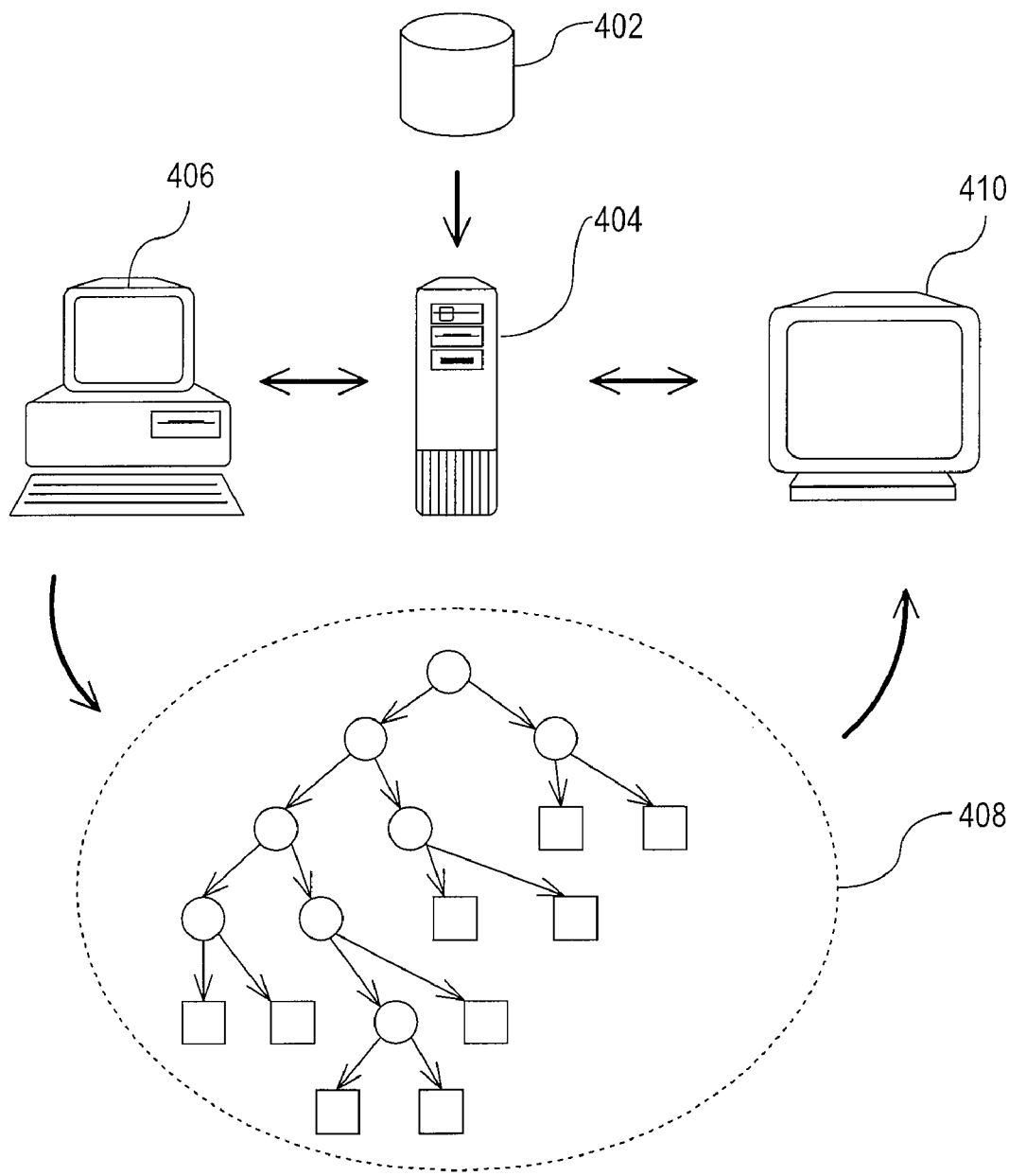
FIG. 4 illustrates a computer system for transaction review.

An embodiment of a transaction review system is illustrated in FIG. 4. Transaction review system 400 comprises database 402, server 404, modeling computer 406, hierarchical decision tree 408, and review terminal 410.

Database 402 contains online transaction data used to construct hierarchical decision tree 408 that is consulted during the manual review of a proposed online transaction. Database 402 may be external to, and connected to, server 404. In an embodiment, database 402 resides on server 404.

Database 402 periodically accepts transaction data from actual online transactions. Transaction data may be accepted from one or more of the following sources, such as external disk drives, flash drives, read-only or random access memory, or via one or more network connections. In an embodiment, database 402 may separate historical data transactions, that is, transaction action data used to form hierarchical decision tree 408 available to manual reviewers, from more current transaction data to be used to update current models or create new models.

Server 404 contains computer executable software or hardware code used to create and maintain one or more hierarchical decision trees, and to provide a user interface for transaction review system 400 through modeling computer 406 for an administrator of transaction review system 400. Server 404 also contains computer executable software or hardware code used to calculate summary statistics for transaction data in database 402. In an embodiment, transaction data in database 402 may be organized by reviewer, so that hierarchical decision tree 408 may be constructed from historical transaction data from a selected set of one or more reviewers, thus providing a manner to 'clone' the knowledge and expertise of one or more talented reviewers.

In an embodiment, each hierarchical decision tree 408 created using transaction review system 400 is represented in one or more XML files. In an embodiment, each hierarchical decision tree 408 is stored in server 404. In an embodiment, each hierarchical decision tree 408 is stored in local storage on modeling computer 406.

An example of portion of a hierarchical decision tree encoded using XML is the following

```
<merchant_id    depth=0 total=3141720 RejectRate=6.60% cardinality=329>
        <ACME              depth=1 total=177275 RejectRate=5.28%>
            <model_used    depth=2 total=177275 RejectRate=5.28% cardinality=1>
                <default       depth=3 total=177275 RejectRate=5.28%>
                    <bill_country    depth=4 total=177275 RejectRate=5.28% cardinality=1>
                        <us depth=5   total=177275 RejectRate=5.28%>
                            <post_data_fusion_score    depth=6 total=177275 RejectRate=5.28% cardinality=4>
                                <0-0 depth=7 total=10280 RejectRate=3.51%>
                                    <UNV_PH depth=8 total=10280 RejectRate=3.51% cardinality=2 FireRate=0.12%>
                                        <1 depth=9 total=12 RejectRate=8.33%>
                                            <leaf depth=10 total=10280 RejectRate=8.33%>
                                            <\leaf>
                                        <\1>
                                        <0 depth=9 total=10268 RejectRate=3.51%>
                                            <RISK_PH depth=10 total=10268 RejectRate=3.51% cardinality=2 FireRate=0.12%>
                                                <1 depth=11 total=12 RejectRate=0.00%>
                                                    <leaf depth=12 total=10268 RejectRate=0.00%>
                                                    <\leaf>
                                                <\1>
                                                <0 depth=11 total=10256 RejectRate=3.51%>
                                                    <VEL_NAME depth=12 total=10256 RejectRate=3.51%
                                                    cardinality=2 FireRate=1.66%>
                                                        <1 depth=13 total=170 RejectRate=1.76%>
                                                            <leaf depth=15 RejectRate=1.76%>
                                                            <\leaf>
                                                        <\1>
                                                        <0 depth=13 total=10086 RejectRate=3.54%>
                                                            <leaf depth=15 RejectRate=3.54%>
                                                            <\leaf>
                                                        <\0>
                                                <\0>
                                        <\0-0>
                                <1-29 depth=7 total=76953 RejectRate=4.13%>
                                    <VEL_NAME depth=8 total=76953 RejectRate=4.13% cardinality=2 FireRate=9.68%>
                                        <1 depth=9 total=7450 RejectRate=2.19%>
                                            <UNV_PH depth=10 total=7450 RejectRate=2.19% cardinality=2 FireRate=0.20%>
                                                <1 depth=11 total=15 RejectRate=6.67%>
                                                    <leaf depth=12 total=7450 RejectRate=6.67%>
                                                    <\leaf>
                                                <\1>
                                                <0 depth=11 total=7435 RejectRate=2.18%>
                                                    <RISK_PH depth=12 total=7435 RejectRate=2.18%
                                                    cardinality=2 FireRate=0.27%>
                                                        <1 depth=13 total=20 RejectRate=5.00%>
                                                            <leaf depth=14 total=7435 RejectRate=5.00%>
                                                            <\leaf>
                                                        <\1>
```

```
                                    <0 depth=13 total=7415 RejectRate=2.17%>
                                        <leaf depth=15 RejectRate=2.17%>
                                        <\leaf>
                                    <\0>
                                <\0>
                            <\1>
                            <0 depth=9 total=69503 RejectRate=4.34%>
                                <UNV_PH depth=10 total=69503 RejectRate=4.34% cardinality=2 FireRate=0.33%>
                                    <1 depth=11 total=228 RejectRate=5.70%>
                                        <leaf depth=13 RejectRate=5.70%>
                                        <\leaf>
                                    <\1>
                                    <0 depth=11 total=69275 RejectRate=4.33%>
                                        <RISK_PH depth=12 total=69275 RejectRate=4.33%
                                        cardinality=2 FireRate=0.22%>
                                            <1 depth=13 total=153 RejectRate=3.27%>
                                                <leaf depth=15 RejectRate=3.27%>
                                                <\leaf>
                                            <\1>
                                            <0 depth=13 total=69122 RejectRate=4.34%>
                                                <leaf depth=15 RejectRate=4.34%>
                                                <\leaf>
                                            <\0>
                                        <\0>
                                    <\1-29>
                                        <\post_data_fusion_score >
                                    <\us>
                                <\bill_counrty>
                            <\default>
                        <\model_used>
                    <\ACME>
                <\merchant_id>
```

XML offers a convenient and machine-independent representation that is easily traversed when a transaction under review is processed to provide the manual reviewer a recommendation regarding whether to accept or reject the transaction under review.

Each manual reviewer accesses transaction review system 400 through review terminal 410 that is connected to server 404 via one more network connections. In an embodiment, each manual reviewer lacks one or more administrative functions provided to an administrator who accesses transaction review system 400 through modeling computer 406. For example, manual reviewers may not be able to alter hierarchical decision tree 408 used to provide a transaction recommendation. However, a manual reviewer may provide input to transaction review system 400 for use in refining current models or building future models. In an embodiment, a manual reviewer may annotate a review decision with one or more reason codes or plain text describing one or more transaction data values that the reviewer cites as determinative in the reviewer's final transaction decision. Such information is input at review terminal 410 in addition to the reviewer's transaction decision, and may be further processed by an administrator during model construction.

Figure 5:
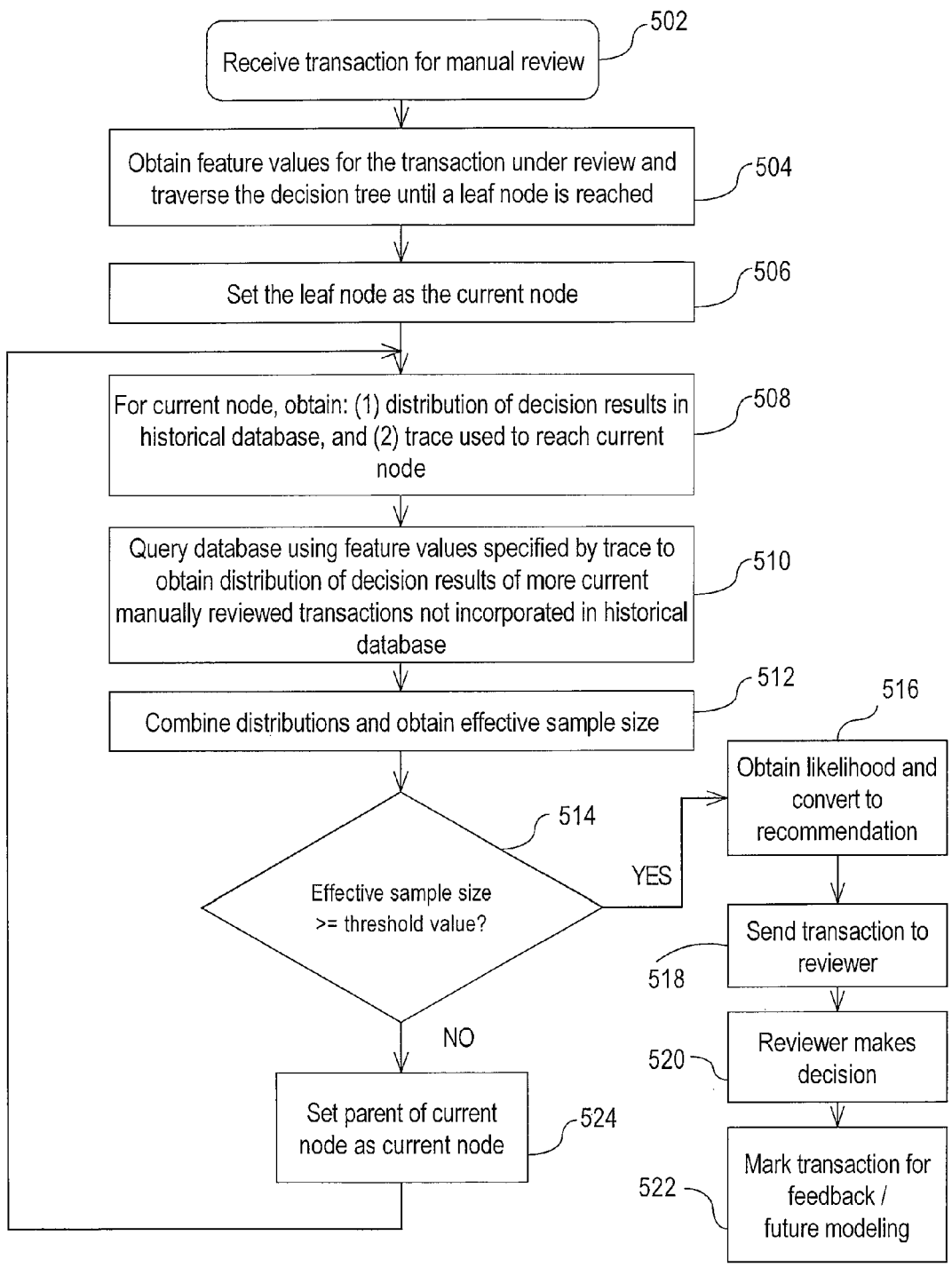
FIG. 5 illustrates a transaction review as part of a transaction fraud screening service.

FIG. 5 illustrates a transaction review as part of a transaction fraud screening service. At step 502, a transaction for manual review is received by transaction review system 400. At step 504, the transaction feature values for the transaction under review are obtained. Using these obtained transaction feature values, hierarchical decision tree 408 is traversed until a leaf node is reached.

At step 506, the leaf node is set as the current node.

At step 508, with respect to the historical portion of the database, the distribution of decision results for manually reviewed transactions at the current node is obtained, along with the trace used to reach the current node. As a non-limiting example, suppose the number of manually reviewed transactions at the current node that (a) are contained in the historical portion of the database, and (b) were used in construction of hierarchical decision tree 408, comprise 10 rejected transactions and 30 accepted transactions.

At step 510, the database is queried using the feature values specified by the trace to obtain the decision results of manually reviewed transactions that have not been incorporated into the historical portion of the database. These decision results correspond to manual review decisions made after construction of hierarchical decision tree 408. For example, hierarchical decision tree 408 may be constructed on a periodic basis, such as every 90 days. Thus, if hierarchical decision tree 408 was constructed 45 days ago, transaction data for the past 45 days has not been placed into the historical portion of the database. Similarly, the transaction data for the past 45 days was not used to construct the current version of hierarchical decision tree 408.

With respect to the non-limiting example, suppose that the number of manually reviewed transactions at the current node that (a) are not contained in the historical portion of the database, and (b) were not used in construction of hierarchical decision tree 408, may comprise 5 rejected transactions and 5 accepted transactions. These transactions occurred after hierarchical decision tree 408 was constructed.

At step 512, the decision results of manually reviewed transactions from both the historical portion of the database and the current portion of the database are combined and an effective sample size is obtained. In an embodiment, weights based on the age of each transaction are applied to each transaction. For example, more current transactions may receive more weight than transactions occurring in the past. Use of age-based weights would give more weight to more recent transaction decisions. The more recent transaction decisions may themselves result from changing patterns of fraudulent activity detected among the more current transactions.

Using the non-limiting example from above, the total sample size obtained by combining the historical portion of the database together with the more recent transactions is 15 rejections (=10 historical+5 current) out of a total of 50 transactions (=40 historical+10 current). However, suppose that each historical transaction receives only half the weight of a current transaction for determining the effective sample size and the rejection rate. Then the effective sample size becomes 10 rejections (=5 historical+5 current) out of a total of 30 transactions (=20 historical+10 current).

At step 514, the effective sample size is compared to a threshold value. Should the effective sample size be too small, then at step 524 the parent of the current node is set as the current node, and control resumes at step 508. If the effective sample size is greater than or equal to the threshold value, then at step 516, a likelihood value is obtained and converted into a recommendation.

Using the current example, suppose the threshold value equals 20, then the effective sample size of 30 is sufficient to obtain a likelihood value of 33%, which equals 10 rejections out of a total of 30 transactions.

Figure 6:
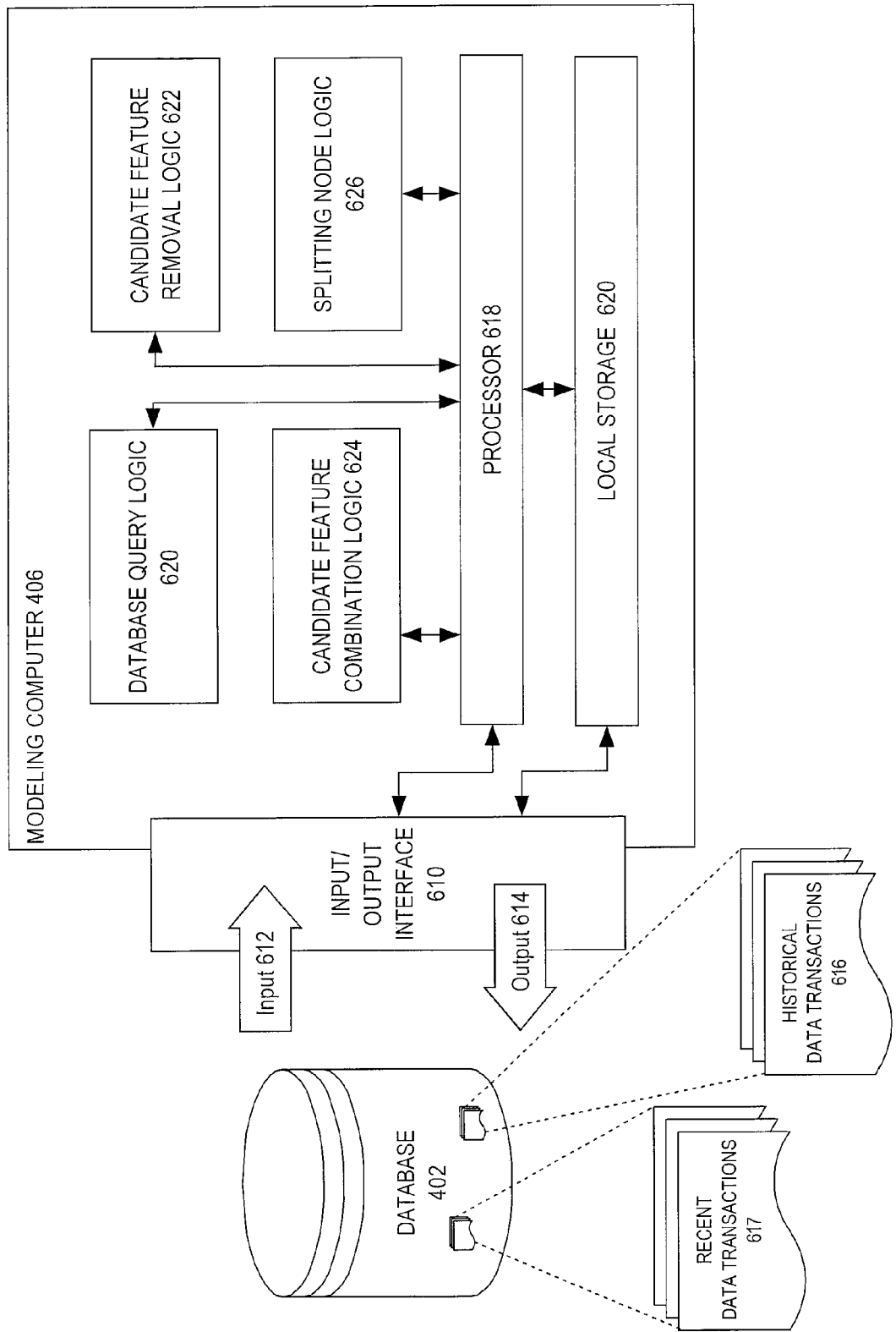
FIG. 6 illustrates computer logic for transaction review.

At step 518, the transaction and recommendation are sent to the reviewer for manual review and decision. At step 520, the reviewer makes a decision, and the transaction, the review's decision, and other feedback that may be provided by the reviewer is marked and placed in FIG. 6 illustrates computer logic for transaction review contained in transaction review system 400. In an embodiment, this computer logic is executed on modeling computer 406. Modeling computer 406 has processor input/output interface 610, processor 618, local storage 620, and logic modules described below. Modeling computer 406 communicates with database 402 through input/output interface 610 having input 612 and output 614. In an embodiment, database 402 contains historical data transactions 616 that are used by modeling computer 406 to construct hierarchical decision tree 408, and current data transactions 617 corresponding to data transactions occurring after hierarchical decision tree 408 has been constructed.

Modeling computer 406 has logic modules comprising database query logic 620, candidate feature selection logic 622, candidate feature combination logic 624, and splitting node logic 626. Database query logic 620 queries database 402 to obtain historical data transactions 616 used as input data at step 202 of FIG. 2. Candidate feature removal logic 622 performs the removal of features from the set of available candidate features, performed at step 204 of FIG. 2.

Candidate feature combination logic 624 performs the combination of features from the set of available candidate features having a large association, performed at step 206 of FIG. 2. Splitting node logic 626 selects and removes splitting nodes to construct hierarchical decision tree 408, as performed at steps 208-214 of FIG. 2. In an embodiment, once constructed, hierarchical decision tree 408 is stored in modeling computer 406 in local storage 620.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
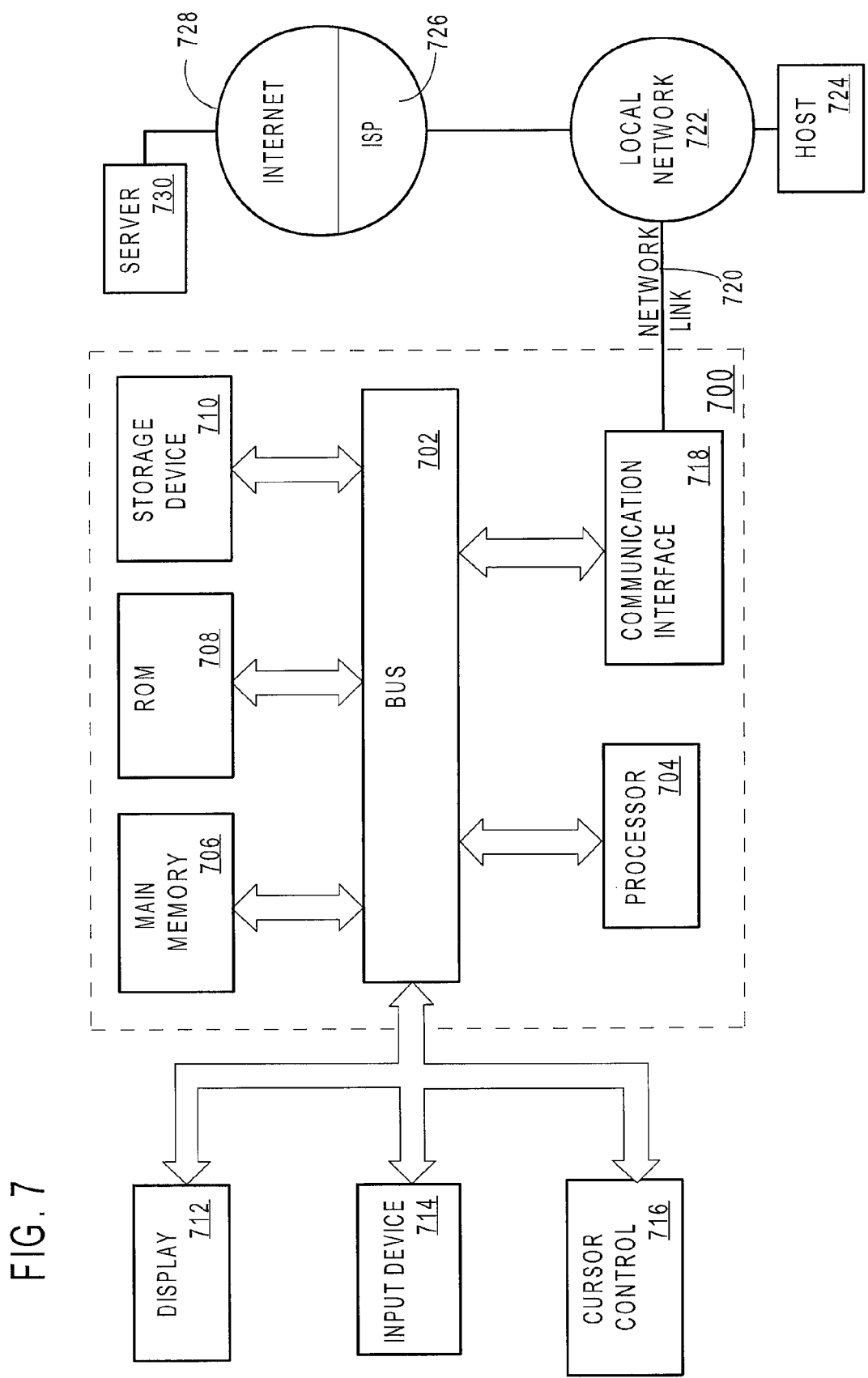
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 602 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:

obtaining, using one or more processing units, a set of historical data, wherein historical data includes one or more decision values and one or more features, wherein the one or more features are selected from a feature set, and wherein each feature has an associated feature value;

determining, using the one or more processing units, whether any features in the feature set have been pre-selected, wherein pre-selected features are removed from the feature set;

calculating, using the one or more processing units, a predictive value for each remaining feature in the feature set using decision values and feature values included with the set of historical data, wherein a predictive value is significant or insignificant;

generating, using the one or more processing units, a relevant feature set including features having a significant predictive value;

calculating, using the one or more processing units, association values using the feature values included with the set of historical data, wherein each association value corresponds to a feature combination from the relevant feature set;

generating, using the one or more processing units, one or more feature combinations according to the association values;

updating, using the one or more processing units, the relevant feature set by adding the one or more feature combinations to the relevant feature set, wherein individual features represented by the feature combinations are removed from the relevant feature set;

generating, using the one or more processing units, a model by repeatedly selecting a feature or a feature combination from the updated relevant feature set until a stopping criteria has been satisfied, wherein the model is generated using the pre-selected features, the selected features, and the selected feature combinations;

receiving, using the one or more processing units, new data, wherein the new data has one or more features, and wherein each feature has an associated feature value; and using, using the one or more processing units, the model and the new data to identify information associated with a subset of historical data from the set of historical data, wherein historical data within the subset has one or more features and feature values that are similar to the one or more features and feature values in the new data, and wherein similarities are based upon one or more predetermined similarity criteria.

2. The method of claim 1, wherein a predictive value is significant when an absolute value of the predictive value is greater than a predetermined threshold.

3. The method of claim 1, wherein a feature combination from the relevant feature set is a combination of a predetermined number of features, and wherein an association value is calculated for each feature combination in the relevant feature set.

4. The method of claim 1, wherein each feature combination has an associated feature combination value, and wherein determining feature combination values includes using feature values associated with the individual features in the associated feature combination.

5. The method of claim 4, wherein the data model is a decision tree with one or more decision nodes, one or more leaf nodes, and one or more edges connecting the nodes, wherein a decision node represents a feature or a feature combination, wherein an edge from a decision node represents an associated value for the feature or feature combination represented by the decision node, wherein one of the decision nodes is a root decision node, wherein a leaf node contains information associated with a subset of the set of historical data, and wherein the subset of historical data includes historical data having features and feature values corresponding to the nodes and edges linking the leaf node to the root decision node.

6. The method of claim 5, wherein nodes closer to the root decision node represent features or feature combinations having a higher predictive value.

7. The method of claim 5, wherein decision nodes closest to the root decision node represent the pre-selected features.

8. The method of claim 5, wherein repeatedly selecting includes determining whether an undetermined node in the decision tree is a decision node or a leaf node, and determining a set of matching historical data at the undetermined node.

9. The method of claim 8, wherein the set of matching historical data includes historical data having features and feature values corresponding to the nodes and edges linking the undetermined node to the root decision node.

10. The method of claim 8, wherein the undetermined node is a leaf node when the set of matching historical data includes less than a predetermined number of historical data.

11. The method of claim 8, wherein repeatedly selecting includes generating one or more contingency tables corresponding to a feature or feature combination in the relevant feature set, and wherein a contingency table is generated using the set of matching historical data.

12. The method of claim 11, wherein a contingency table for a feature or feature combination categorizes the set of matching historical data using the decision values and the feature values associated with the feature or feature combination.

13. The method of claim 8, wherein repeatedly selecting includes calculating one or more feature entropies, wherein a feature entropy corresponds to a feature or feature combination, and wherein a feature entropy is calculated using the set of matching historical data.

14. The method of claim 13, wherein the undetermined node is a leaf node when the feature entropies are less than a predetermined value.

15. The method of claim 13, wherein a feature or feature combination is selected using the corresponding feature entropy, and wherein the undetermined node is determined to be a decision node representing the selection.

16. The method of claim 8, wherein repeatedly selecting includes calculating one or more risk values, wherein a risk value corresponds to a feature or feature combination, and wherein a risk value is calculated using the set of matching historical data.

17. The method of claim 16, wherein a feature or feature combination is selected using the corresponding risk value, and wherein the undetermined node is determined to be a decision node representing the selection.

18. The method of claim 16, wherein the risk value is an absolute risk.

19. The method of claim 16, wherein the risk value is a relative risk.

20. The method of claim 1, wherein the set of historical data includes historical data within a predetermined time period.

21. The method of claim 20, wherein when the subset of historical data includes less than a predetermined amount of historical data, the set of historical data is enlarged by broadening the predetermined time period.

22. The method of claim 1, wherein when the subset of historical data includes less than a predetermined amount of historical data, a new subset of historical data is identified using the model and a subset of features and associated feature values in the new data.

23. The method of claim 1, wherein the predetermined similarity criteria defines a feature value range for an associated feature.

24. The method of claim 1, further comprising:
obtaining, using the one or more processing units, a trace record, wherein the trace record includes information associated with the features used by the model to identify information associated with the subset of historical data;
using, using the one or more processing units, the trace record and the new data to request information associated with a subset of recent data from a set of recent data, wherein the set of recent data was not used to generate the model; and
determining, using the one or more processing units, combined information including the information associated with the subset of historical data and the information associated with the subset of recent data.

25. The method of claim 24, further comprising:
generating, using the one or more processing units, an updated trace record by removing one or more features from the trace record when the combined information includes less than a predetermined amount of data; and
requesting, using the one or more processing units, information associated with a new subset of recent data using the updated trace record and the new data.

26. The method of claim 24, wherein a predetermined weight is applied to the information associated with the subset of historical data, and wherein a different predetermined weight is applied to the information associated with the subset of recent data.

27. The method of claim 24, further comprising:
determining, using the one or more processing units, a projected decision value for the new data using the information associated with the subset of historical data and the information associated with the subset of recent data.

28. The method of claim 1, further comprising:
determining, using the one or more processing units, a projected decision value for the new data using the information associated with the subset of historical data.

29. The method of claim 1, further comprising:
updating, using the one or more processing units, the model using the new data.

30. A system, comprising:
one or more processors;
a non-transitory computer-readable storage medium containing instructions configured to cause the one or more processors to perform operations, including:

obtaining a set of historical data, wherein historical data includes one or more decision values and one or more features, wherein the one or more features are selected from a feature set, and wherein each feature has an associated feature value;

determining whether any features in the feature set have been pre-selected, wherein pre-selected features are removed from the feature set;

calculating a predictive value for each remaining feature in the feature set using decision values and feature values included with the set of historical data, wherein a predictive value is significant or insignificant;

generating a relevant feature set including features having a significant predictive value;

calculating association values using the feature values included with the set of historical data, wherein each association value corresponds to a feature combination from the relevant feature set;

generating one or more feature combinations according to the association values;

updating the relevant feature set by adding the one or more feature combinations to the relevant feature set, wherein individual features represented by the feature combinations are removed from the relevant feature set;

generating a model by repeatedly selecting a feature or a feature combination from the updated relevant feature set until a stopping criteria has been satisfied, wherein the model is generated using the pre-selected features, the selected features, and the selected feature combinations;

receiving new data, wherein the new data has one or more features, and wherein each feature has an associated feature value; and using the model and the new data to identify information associated with a subset of historical data from the set of historical data, wherein historical data within the subset has one or more features and feature values that are similar to the one or more features and feature values in the new data, and wherein similarities are based upon one or more predetermined similarity criteria.

31. The system of claim 30, wherein a predictive value is significant when an absolute value of the predictive value is greater than a predetermined threshold.

32. The system of claim 30, wherein a feature combination from the relevant feature set is a combination of a predetermined number of features, and wherein an association value is calculated for each feature combination in the relevant feature set.

33. The system of claim 30, wherein each feature combination has an associated feature combination value, and wherein determining feature combination values includes using feature values associated with the individual features in the associated feature combination.

34. The system of claim 33, wherein the data model is a decision tree with one or more decision nodes, one or more leaf nodes, and one or more edges connecting the nodes, wherein a decision node represents a feature or a feature combination, wherein an edge from a decision node represents an associated value for the feature or feature combination represented by the decision node, wherein one of the decision nodes is a root decision node, wherein a leaf node contains information associated with a subset of the set of historical data, and wherein the subset of historical data includes historical data having features and feature values corresponding to the nodes and edges linking the leaf node to the root decision node.

35. The system of claim 34, wherein nodes closer to the root decision node represent features or feature combinations having a higher predictive value.

36. The system of claim 34, wherein decision nodes closest to the root decision node represent the pre-selected features.

37. The system of claim 34, wherein repeatedly selecting includes determining whether an undetermined node in the decision tree is a decision node or a leaf node, and determining a set of matching historical data at the undetermined node.

38. The system of claim 37, wherein the set of matching historical data includes historical data having features and feature values corresponding to the nodes and edges linking the undetermined node to the root decision node.

39. The system of claim 37, wherein the undetermined node is a leaf node when the set of matching historical data includes less than a predetermined number of historical data.

40. The system of claim 37, wherein repeatedly selecting includes generating one or more contingency tables corresponding to a feature or feature combination in the relevant feature set, and wherein a contingency table is generated using the set of matching historical data.

41. The system of claim 40, wherein a contingency table for a feature or feature combination categorizes the set of matching historical data using the decision values and the feature values associated with the feature or feature combination.

42. The system of claim 37, wherein repeatedly selecting includes calculating one or more feature entropies, wherein a feature entropy corresponds to a feature or feature combination, and wherein a feature entropy is calculated using the set of matching historical data.

43. The system of claim 42, wherein the undetermined node is a leaf node when the feature entropies are less than a predetermined value.

44. The system of claim 42, wherein a feature or feature combination is selected using the corresponding feature entropy, and wherein the undetermined node is determined to be a decision node representing the selection.

45. The system of claim 37, wherein repeatedly selecting includes calculating one or more risk values, wherein a risk value corresponds to a feature or feature combination, and wherein a risk value is calculated using the set of matching historical data.

46. The system of claim 45, wherein a feature or feature combination is selected using the corresponding risk value, and wherein the undetermined node is determined to be a decision node representing the selection.

47. The system of claim 45, wherein the risk value is an absolute risk.

48. The system of claim 45, wherein the risk value is a relative risk.

49. The system of claim 30, wherein the set of historical data includes historical data within a predetermined time period.

50. The system of claim 49, wherein when the subset of historical data includes less than a predetermined amount of historical data, the set of historical data is enlarged by broadening the predetermined time period.

51. The system of claim 30, wherein when the subset of historical data includes less than a predetermined amount of historical data, a new subset of historical data is identified using the model and a subset of features and associated feature values in the new data.

52. The system of claim 30, wherein the predetermined similarity criteria defines a feature value range for an associated feature.

53. The system of claim 30, further comprising instructions to cause the one or more processors to perform operations, including:
  obtaining a trace record, wherein the trace record includes information associated with the features used by the model to identify information associated with the subset of historical data;
  using the trace record and the new data to request information associated with a subset of recent data from a set of recent data, wherein the set of recent data was not used to generate the model; and
  determining combined information including the information associated with the subset of historical data and the information associated with the subset of recent data.

54. The system of claim 53, further comprising instructions to cause the one or more processors to perform operations, including:
  generating an updated trace record by removing one or more features from the trace record when the combined information includes less than a predetermined amount of data; and
  requesting information associated with a new subset of recent data using the updated trace record and the new data.

55. The system of claim 53, wherein a predetermined weight is applied to the information associated with the subset of historical data, and wherein a different predetermined weight is applied to the information associated with the subset of recent data.

56. The system of claim 53, further comprising instructions to cause the one or more processors to perform operations, including:
  determining a projected decision value for the new data using the information associated with the subset of historical data and the information associated with the subset of recent data.

57. The system of claim 30, further comprising instructions to cause the one or more processors to perform operations, including:
  determining a projected decision value for the new data using the information associated with the subset of historical data.

58. The system of claim 30, further comprising instructions to cause the one or more processors to perform operations, including:
  updating the model using the new data.

59. A computer program product, tangibly embodied in a non-transitory machine readable storage medium, including instructions configured to cause a data processing apparatus to:
  obtain a set of historical data, wherein historical data includes one or more decision values and one or more features, wherein the one or more features are selected from a feature set, and wherein each feature has an associated feature value;
  determine whether any features in the feature set have been pre-selected, wherein pre-selected features are removed from the feature set;
  calculate a predictive value for each remaining feature in the feature set using decision values and feature values included with the set of historical data, wherein a predictive value is significant or insignificant;
  generate a relevant feature set including features having a significant predictive value;
  calculate association values using the feature values included with the set of historical data, wherein each association value corresponds to a feature combination from the relevant feature set;
  generate one or more feature combinations according to the association values;
  update the relevant feature set by adding the one or more feature combinations to the relevant feature set, wherein individual features represented by the feature combinations are removed from the relevant feature set;
  generate a model by repeatedly selecting a feature or a feature combination from the updated relevant feature set until a stopping criteria has been satisfied, wherein the model is generated using the pre-selected features, the selected features, and the selected feature combinations;
  receive new data, wherein the new data has one or more features, and wherein each feature has an associated feature value; and
  use the model and the new data to identify information associated with a subset of historical data from the set of historical data, wherein historical data within the subset has one or more features and feature values that are similar to the one or more features and feature values in the new data, and wherein similarities are based upon one or more predetermined similarity criteria.

60. The computer program product of claim 59, wherein a predictive value is significant when an absolute value of the predictive value is greater than a predetermined threshold.

61. The computer program product of claim 59, wherein a feature combination from the relevant feature set is a combination of a predetermined number of features, and wherein an association value is calculated for each feature combination in the relevant feature set.

62. The computer program product of claim 59, wherein each feature combination has an associated feature combination value, and wherein determining feature combination values includes using feature values associated with the individual features in the associated feature combination.

63. The computer program product of claim 62, wherein the data model is a decision tree with one or more decision nodes, one or more leaf nodes, and one or more edges connecting the nodes, wherein a decision node represents a feature or a feature combination, wherein an edge from a decision node represents an associated value for the feature or feature combination represented by the decision node, wherein one of the decision nodes is a root decision node, wherein a leaf node contains information associated with a subset of the set of historical data, and wherein the subset of historical data includes historical data having features and feature values corresponding to the nodes and edges linking the leaf node to the root decision node.

64. The computer program product of claim 63, wherein nodes closer to the root decision node represent features or feature combinations having a higher predictive value.

65. The computer program product of claim 63, wherein decision nodes closest to the root decision node represent the pre-selected features.

66. The computer program product of claim 63, wherein repeatedly selecting includes determining whether an undetermined node in the decision tree is a decision node or a leaf node, and determining a set of matching historical data at the undetermined node.

67. The computer program product of claim 66, wherein the set of matching historical data includes historical data having features and feature values corresponding to the nodes and edges linking the undetermined node to the root decision node.

68. The computer program product of claim 66, wherein the undetermined node is a leaf node when the set of matching historical data includes less than a predetermined number of historical data.

69. The computer program product of claim 66, wherein repeatedly selecting includes generating one or more contingency tables corresponding to a feature or feature combination in the relevant feature set, and wherein a contingency table is generated using the set of matching historical data.

70. The computer program product of claim 69, wherein a contingency table for a feature or feature combination categorizes the set of matching historical data using the decision values and the feature values associated with the feature or feature combination.

71. The computer program product of claim 66, wherein repeatedly selecting includes calculating one or more feature entropies, wherein a feature entropy corresponds to a feature or feature combination, and wherein a feature entropy is calculated using the set of matching historical data.

72. The computer program product of claim 71, wherein the undetermined node is a leaf node when the feature entropies are less than a predetermined value.

73. The computer program product of claim 71, wherein a feature or feature combination is selected using the corresponding feature entropy, and wherein the undetermined node is determined to be a decision node representing the selection.

74. The computer program product of claim 66, wherein repeatedly selecting includes calculating one or more risk values, wherein a risk value corresponds to a feature or feature combination, and wherein a risk value is calculated using the set of matching historical data.

75. The computer program product of claim 74, wherein a feature or feature combination is selected using the corresponding risk value, and wherein the undetermined node is determined to be a decision node representing the selection.

76. The computer program product of claim 74, wherein the risk value is an absolute risk.

77. The computer program product of claim 74, wherein the risk value is a relative risk.

78. The computer program product of claim 59, wherein the set of historical data includes historical data within a predetermined time period.

79. The computer program product of claim 78, wherein when the subset of historical data includes less than a predetermined amount of historical data, the set of historical data is enlarged by broadening the predetermined time period.

80. The computer program product of claim 59, wherein when the subset of historical data includes less than a predetermined amount of historical data, a new subset of historical data is identified using the model and a subset of features and associated feature values in the new data.

81. The computer program product of claim 59, wherein the predetermined similarity criteria defines a feature value range for an associated feature.

82. The computer program product of claim 59, further comprising instructions configured to cause a data processing apparatus to:
   obtain a trace record, wherein the trace record includes information associated with the features used by the model to identify information associated with the subset of historical data;
   use the trace record and the new data to request information associated with a subset of recent data from a set of recent data, wherein the set of recent data was not used to generate the model; and
   determine combined information including the information associated with the subset of historical data and the information associated with the subset of recent data.

83. The computer program product of claim 82, further comprising instructions configured to cause a data processing apparatus to:
   generate an updated trace record by removing one or more features from the trace record when the combined information includes less than a predetermined amount of data; and
   request information associated with a new subset of recent data using the updated trace record and the new data.

84. The computer program product of claim 82, wherein a predetermined weight is applied to the information associated with the subset of historical data, and wherein a different predetermined weight is applied to the information associated with the subset of recent data.

85. The computer program product of claim 82, further comprising instructions configured to cause a data processing apparatus to:
   determine a projected decision value for the new data using the information associated with the subset of historical data and the information associated with the subset of recent data.

86. The computer program product of claim 59, further comprising instructions configured to cause a data processing apparatus to:
   determine a projected decision value for the new data using the information associated with the subset of historical data.

87. The computer program product of claim 59, further comprising instructions configured to cause a data processing apparatus to:
   update the model using the new data.

* * * * *